United States Patent [19]

Heitz et al.

[11] Patent Number: 5,026,799

[45] Date of Patent: Jun. 25, 1991

[54] LIVING CATIONIC POLYMERIZATION OF VINYLIC UNSATURATED COMPOUNDS

[75] Inventors: Thomas L. Heitz; Young H. Kim, both of Wilmington, Del.

[73] Assignee: E. I. Du Pont de Nemours and Company, Wilmington, Del.

[21] Appl. No.: 530,679

[22] Filed: May 30, 1990

[51] Int. Cl.$^5$ .............................................. C08F 4/06
[52] U.S. Cl. .................................... 526/192; 526/214
[58] Field of Search ........................................ 526/192

[56] References Cited

U.S. PATENT DOCUMENTS 4,393,199  7/1983  Manser ............................... 528/408
4,696,988  9/1987  Higashimura et al. ............. 526/220

FOREIGN PATENT DOCUMENTS 206756  12/1986  European Pat. Off. .
0228509  10/1985  Japan .

OTHER PUBLICATIONS

M. Sawamoto, C. Okamoto and T. Higashimura (1987) Macromol. 20, 2693-2697.
S. Aoshima and T. Higashimura (1989) Macromol 22, 1009-1013.
M. Kamigaito et al., Polym. Prepr. Japan, No. 2:227-(1990).
T. Higashimura et al., Japan Kokai Tokkyo Koho JP 02 88,607[90 88,607]Mar. 28, 1990.
CA Selects: Initiation of Polymerization, Issue 18, 1990, p. 4, 113:60107(b)-Abstract.
H. Shohi et al., Polym. Bull., 1989, 21, 357.
T. Higashimura, Y. Koshimoto, and S. Aoshima: Polym. Bull., 1987, 18, 111-115.
R. Faust and J. P. Kennedy: Polym. Bull., 1986, 15, 317-323.
F. Bolza et al., Macromol. Chem., 1980, 181, 839.
T. Higashimura and M. Sawamoto: Adv. Polym. Sci., 1984, 62, 50-94.
M. Miyamoto, M. Sawamoto, and T. Higashimura; Macromol, 1984, 17 , 265-268.
S. Aoshima and T. Higashimura; Polym. Bull., 1986, 15, 417-423.

Primary Examiner—Joseph L. Schofer
Assistant Examiner—M. Nagumo

[57] ABSTRACT

This invention relates to a process for the living cationic polymerization of vinylic unsaturated monomers in the presence of halogenated aliphatic acids and the zinc salts of halogenated aliphatic acids.

25 Claims, No Drawings

1

LIVING CATIONIC POLYMERIZATION OF VINYLIC UNSATURATED COMPOUNDS

FIELD OF THE INVENTION

This invention relates to a process for the living cationic polymerization of vinylic unsaturated compounds containing electron donating substituents to polymers of narrow molecular weight distribution. The process is used for making intermediates in the production of specialty coatings, sealing materials and adhesives.

BACKGROUND OF THE INVENTION

Living polymerization allows for the synthesis of new polymers and oligomers with controlled molecular weight distribution and with specialized functional substituents. Recent advances have occurred in the polymerization by cationic mechanisms to yield living polymers where living polymer characteristics were not previously obtained due to the reactivity or instability of the compositions involved.

T. Higashimura and M. Sawamoto; Adv. Polym. Sci., 1984, 62, 50-94, review the attempts at living cationic polymerization of vinyl monomers and state that until recently it was considered "beyond our reach." They disclose the use of an $HI/I_2$ initiating system to polymerize isobutyl vinyl ether in n-hexane. They claim this polymerization system to be the first example of living cationic polymerization of vinyl compounds.

M. Miyamoto, M. Sawamoto, and T. Higashimura; Macromol 1984, 17, 265-268 show that living polymerization of isobutylvinyl ether using $HI/I_2$, $I_2$, or HI as initiators, does not occur in a polar solvent such as $CH_2Cl_2$.

S. Aoshima and T. Higashimura; Polym. Bull., 1986, 15, 417-423, disclose the use of esters as Lewis base modifiers for $EtAlCl_2$. These systems are used as initiators for the living cationic polymerization of vinyl ethers.

T. Higashimura, Y. Kishimoto, and S. Aoshima; Polym. Bull., 1987, 18, 111-115 disclose the use of an $EtAlCl_2$/dioxane initiating system for the living cationic polymerization of vinyl monomers.

R. Faust and J. P. Kennedy; Polym Bull., 1986, 15, 317-323, describe the living carbocationic polymerizations of isobutene using initiating complexes of organic esters with Lewis acids.

EP 206,756, discloses the use of complexes of Lewis acids and organic acids or esters as catalysts for the living polymerization of olefins and diolefins.

JP J6 0228-509, discloses the preparation of polyalkenyl ethers by living polymerization using as catalysts iodine and optionally HI.

U.S. Pat. No. 4,393,199 discloses a method of polymerizing monomers capable of cationic polymerization by using an adduct consisting of a preinitiator precursor and a catalyst, to react with the monomer and produce a polymer of low polydispersity.

U.S. Pat. No. 4,696,988 discloses the use of $HI/I_2$ initiating systems to polymerize isopropenylphenyl glycidyl ethers.

F. Bolza et al., Makromol Chem., 1980, 181, 839, disclose the polymerization of isobutyl vinyl ether with trifluoroacetic acid in methylene chloride and carbon tetrachloride in the range of $-2.5°$ to $35°$ C. Their results do not support a living polymerization mechanism.

H. Shohi et al., Polym. Bull, 1989, 21, 357, disclose that an adduct of trifluoroacetic acid to an alkyl vinyl ether can be used for living polymerization of alkyl vinyl ethers, using ethylaluminium dichloride as a catalyst. In this case, the presence of 1,4-dioxane in the polymerization solvent is absolutely necessary for living polymerization in order to stabilize the growing chain end.

S. Aoshima et al., Macromol.,1989, 22, 1009, disclose that polymerization of alkylvinyl ether with trifluoroacetic acid or an adduct of acetic acid and an alkyl vinyl ether as an initiator and ethylaluminium dichloride as a catalyst. As above the presence of a Lewis base, ethyl acetate, in the solvent is absolutely necessary for living polymerization in order to stabilize the growing chain end.

The above described art shows that living cationic polymerization requires either a cosolvent as a stabilizer or a unique combination of an initiator/catalyst.

It is difficult to predict which initiator/catalyst combinations will result in a living cationic polymerization of a vinyl monomer. For example, S. Aoshima and T. Higashimura, op. cit., show that living polymerizations of 2-vinyloxyethyl benzoate and 2-vinyloxyethyl methacrylate monomers, where the ester functioning as a Lewis base is incorporated within its structure, can be conducted using $EtAlCl_2$ but not with $BF_3OEt_2$.

The present invention provides a process for the cationic polymerization of vinylic unsaturated compounds using a mixture of a halogenated acid and a zinc salt of a halogenated acid as an initiator and catalyst respectively.

SUMMARY OF INVENTION

The present process uses a mixture of a halogenated aliphatic acid and a zinc salt of a halogenated aliphatic acid as an initiator/catalyst combination for the living polymerization of isobutyl vinyl ether, optionally in a solvent such as in hexane or methylene chloride, at temperatures of about $-80°$ C. up to the refluxing solvent temperature. The process is carried out under substantially anhydrous conditions. The preferred temperature range is about $-30°$ C. to ambient temperature. Examples of halogenated aliphatic acids useful in this invention include trifluoroacetic acid trichloroacetic acid and dichloroacetic acid. The zinc salts of these halogenated acids are prepared by mixing diethylzinc with the corresponding acid. The "livingness" of the polymerization is confirmed by the narrow molecular weight distribution of the polymer product and the increase of molecular weight on sequential monomer addition. This is an improvement over copending patent application Ser. No. 276,352, in which living polymerization of vinyl ether occurs with the help of a Lewis base, for example dimethyl sulfide. The present process requires no stabilizing agent, and the reaction can be undertaken at room temperature.

DETAILED DESCRIPTION OF THE INVENTION

Electron rich vinyl monomers, such as p-methylstyrene, p-methoxy styrene, and alkyl vinyl ethers can be polymerized by cationic polymerization. This invention teaches a process for the living polymerization of alkyl vinyl ethers in an optional solvent at temperatures ranging from about $-80°$ C. to the refluxing solvent temperature, where the reaction is carried out in a solvent or $-80°$ C. to room temperature where no solvent is employed. The preferred temperature range is about −30° C. to room temperature. Most preferred temperatures are about −30° C. to about −10° C. in CH$_2$Cl$_2$ or CCl$_4$ and room temperature in hexane. Solvents that can be used include C$_5$–C$_{14}$ alkanes, cycloalkanes or mixtures thereof, benzene, toluene, xylene, methylene chloride, chloroform and carbon tetrachloride.

The initiators of this invention are α,α-dihalo acids of pKa <2.5.

The preferred initiator is a halogenated C$_2$–C$_5$ aliphatic acid of the following formula:

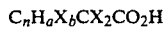

wherein n=0–3, a=0–7, b=0–7; and X is selected from the group consisting of fluorine, chlorine and bromine. Examples of commercially available α,α-dihalo acids are shown in Table 1 below:

TABLE 1

| n | a | b | $X_b$ | X | Formula |
|---|---|---|-------|---|---------|
| 0 | 0 | 1 | Br | Br | CBr$_3$CO$_2$H |
| 0 | 0 | 1 | Cl | Cl | CCl$_3$CO$_2$H |
| 0 | 0 | 1 | F | F | CF$_3$CO$_2$H |
| 0 | 0 | 1 | F | Br | CBr$_2$FCO$_2$H |
| 0 | 0 | 1 | Cl | F | CClF$_2$CO$_2$H |
| 0 | 1 | 0 | — | Cl | CHCl$_2$CO$_2$H |
| 0 | 1 | 0 | — | F | CHF$_2$CO$_2$H |
| 1 | 0 | 3 | F | F | CF$_3$CF$_2$CO$_2$H |
| 2 | 0 | 5 | F | F | CF$_3$CF$_2$CF$_2$CO$_2$H |

Other C$_2$–C$_5$ aliphatic acids of the formula

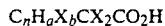

that can be synthesized by known methods include, but are not limited to, those shown in Table 2.

TABLE 2

| n | a | b | $X_b$ | X | Formula |
|---|---|---|-------|---|---------|
| 1 | 0 | 3 | F | Br | CF$_3$CBr$_2$CO$_2$H |
| 1 | 0 | 3 | F | Cl | CF$_3$CCl$_2$CO$_2$H |
| 1 | 3 | 0 | — | Cl | CH$_3$CCl$_2$CO$_2$H |
| 1 | 0 | 3 | Cl | F | CCl$_3$CF$_2$CO$_2$H |
| 1 | 0 | 3 | Cl, F | F | CCl$_2$FCF$_2$CO$_2$H |
| 1 | 1 | 2 | Cl, F | F | CHClFCF$_2$CO$_2$H |
| 1 | 1 | 2 | F | F | CHF$_2$CF$_2$CO$_2$H |
| 1 | 1 | 2 | Cl, Br | F | CHBrClCF$_2$CO$_2$H |
| 2 | 1 | 4 | F | F | CF$_3$CHFCF$_2$CO$_2$H |
| 2 | 5 | 0 | — | F | CH$_3$CH$_2$CF$_2$CO$_2$H |
| 3 | 5 | 2 | Br | F | CH$_2$BrCBr(Me)CF$_2$CO$_2$H |

The polymerization was initiated by mixing the corresponding acids with the monomer. The formation of the adducts of the halogenated acids with the monomer was instantaneous, as confirmed by NMR experiments. The acid adducts were stable in the absence of a catalyst for at least 3 days in deuterated cyclohexane, or within the time scale of the polymerization, in a mixture of CCl$_4$/CDCl$_3$ (1:1) in the presence of about one equivalent of the monomer at room temperature. After several days in the mixture of CCl$_4$/CDCl$_3$ the monomer seems to have oligomerized with the adduct, but in cyclohexane, no consumption of monomer was found. Rapid polymerization can be realized only when a zinc salt of the halogenated acid is present in the reaction medium as a catalyst.

The reaction is carried out in a substantially anhydrous reaction medium, preferably under an inert atmosphere, such as nitrogen, argon and helium. By substantially anhydrous is meant containing less than 5 ppm of water.

Cross-combination of an acid and a salt also works. For example trichloroacetic acid/zinc dichloroacetate in methylene chloride at −30° C. and trichloroacetic acid/zinc trifluoroacetate in hexane give polymers with a narrow molecular weight distribution again indicating that a living cationic polymerization has occurred.

The polymerization rate (described by the polymer yield after a certain reaction time) is more dependent on the type of catalyst than on the initiator. The rate of polymerization for different catalysts shows the following relationship:

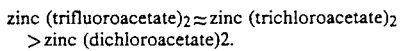

The order of addition is important in some cases. Since the catalysts themselves are capable of polymerizing the monomers, but not to living polymers, care should be taken to suppress polymerization by the catalyst alone, to promote a narrow weight distribution. This is especially true at higher temperatures. At low temperatures, namely −20 and −30° C. the catalyst itself does not polymerize the monomer in any appreciable quantity. The preferred methods of addition are that the monomer be added to the mixture of the initiator and the catalyst or the catalyst be added to the mixture of initiator and monomer.

Monomers useful in this process include, but are not limited to, p-methylstyrene, p-methoxy styrene and alkyl vinyl ethers. Styrene is excluded. Other monomers useful in the invention process include, but are not limited to styrenes with para alkyl or alkoxy substituents, where the alkyl or alkoxy groups contain C$_1$ to C$_6$ carbon atoms; alkyl vinyl ethers or aralkyl vinyl ethers, where the alkyl groups contain one to twenty carbon atoms, and optionally contain halogen atoms such as chlorine, fluorine or bromine, or ether linkages; and N-vinylcarbazole. Preferably the monomer is a C$_1$ to C$_6$ alkyl vinyl ether. Most preferred are methyl vinyl ether, ethyl vinyl ether, n-butyl vinyl ether, or isobutyl vinyl ether. The monomers used herein are either known compounds or can be prepared by known methods.

The polymers produced by this invention generally have a narrow molecular weight distribution. As exemplified herein, the polydispersity is in the range of about 1.03 to about 2.55. The molecular weight distributions are affected by the temperature of the reaction mixture and catalyst olubility in the reaction medium.

In the following embodiments of the invention, temperatures are in degrees Celsius unless otherwise specified. Molecular weights (weight Mw and number Mn average) were determined by gel permeation chromatography (GPC); dispersity, D, is given by the ratio of Mw/Mn.

EXAMPLES

Examples 1–10 were conducted under two sets of conditions:
Condition A: In methylene chloride at −30° C.
Condition B: In hexane at 0° C. and room temperature EXAMPLES 1–6 Under Condition B In a dry box zinc trifluoroacetate (50 mg) trichloroacetic acid (25 μL), and hexane (25 mL were added at room temperature to an oven-dried round bottom flask equipped with a magnetic stirrer to form a cloudy mixture. Isobutyl vinyl ether (IBVE, 3.4 mL) was added to this mixture and reacted for 1.5 hr. At that time the reaction was quenched by the addition of methanol (1.0 mL). The solution was washed with 1 N HCl (10 mL) and twice with 10 mL of water. Upon evaporation of the solvent a clear iscous polymer was obtained. Yield 1.20 g $M_n = 4960$ dispersity = 1.03

Similarly, various acids and zinc salts were used at 0° C. and room temperature. Regardless of the reaction conditions, there was a linear relationship between the polymerization yield and $M_n$ when the polymerization was terminated before total consumption of monomers.

TABLE 3

| Exp. | Initiator | Catalyst | Temp | Yield (%) | Mn | D |
|---|---|---|---|---|---|---|
| 1 | CCl$_3$COOH | Zn(CF$_3$CO$_2$)$_2$ | RT | 50 | 4960 | 1.03 |
| 2 | CCl$_2$HCOOH | Zn(CCl$_2$HCO$_2$)$_2$ | RT | 12 | 712 | 1.30 |
| 3 | CCl$_3$COOH | Zn(CCl$_3$CO$_2$)$_2$ | 0° C. | 16 | 1710 | 2.55 |
| 4 | CF$_3$COOH | Zn(CF$_3$CO$_2$)$_2$ | 0° C. | 29 | 2680 | 1.33 |
| 5 | CF$_3$COOH | Zn(CF$_3$CO$_2$)$_2$ | RT | 49 | 5260 | 1.31 |
| 6 | CCl$_3$COOH | Zn(CCl$_3$CO$_2$)$_2$ | RT | 61 | 7020 | 1.15 |

All of above combinations, under condition B, above, gave polymers with narrow molecular weight distribution. Under these conditions the polymerization was done for 1.5 hr, at 0° C. or at room temperature. The yields of recovered polymer ranged from 12 to 61%. A linear relationship between the number average molecular weight ($M_n$) and polymer yield, which is a test or living cationic polymerization was observed.

EXAMPLES 7-10 Under Condition A

EXAMPLE 7

In a dry box zinc trifluoroacetate (58.2 mg), was added at room temperature to an oven-dried round bottom flask equipped with a magnetic stirrer, followed by addition at −30° C. of methylene chloride (60 mL) IBVE (8 mL) and 1 mL of a 1M solution of deuterated trifluoroacetic acid in methylene chloride. The mixture was stirred for 1 hr at this temperature, then warmed to 0° C. in 2 hr and finally to room temperature. After 70 min at room temperature 5 mL of a mixture of triethylamine and methanol (Et$_3$N/MeOH, 1:2, vol/vol) was added; the solvent was evaporated, and the polymer redissolved in methylene chloride and washed with water. The solvent was again evaporated and the polymer was vacuum dried. Yield 5.80 g $M_n = 6510$ dispersity = 1.26.

Various acids and zinc salts were used to polymerize IBVE under similar conditions to those in Example 7 as shown in the table below for Examples 8-10.

TABLE 4

| Exp. | Initiator | Catalyst | Temp (°C.) | Yield (%) | Mn | D |
|---|---|---|---|---|---|---|
| 7 | CF$_3$COOD | Zn(CF$_3$CO$_2$)$_2$ | −30/1 h, 0/2 h, RT/1.2 h | 94 | 6510 | 1.26 |
| 8 | CCl$_2$HCOOH | Zn(CCl$_2$HCO$_2$)$_2$ | −10 | 89 | 3430 | 1.78 |
| 9 | CCl$_3$COOH | Zn(CCl$_3$CO$_2$)$_2$ | −10 | 100 | 8630 | 2.34 |
| 10 | CCl$_2$HCOOH | Zn(CCl$_3$CO$_2$)$_2$ | −10 | 100 | 5890 | 1.60 |

Under condition A, the combination of trifluoroacetic acid, trichloroacetic acid, dichloroacetic acid and their zinc salts gave polymers with narrow molecular weight distribution. The molar ratio of the catalyst to initiator was 0.2. Under these conditions the polymer was obtained in 90 to 100% yield. The polymer yield was lowest when dichloroacetic acid and its salt were used. The molecular weight distributions of the resulting polymers were narrow. In these experiments, the monomer was added to a catalyst then an initiator was added.

EXAMPLE 11

Successive Monomer Addition

In a dry box zinc trifluoroacetate (58.2 mg) was added at room temperature to an oven-dried round bottom flask equipped with a magnetic stirrer. After attaching a septum adapter bearing a Teflon ® stopcock, the flask was removed from the drybox and charged with dry methylene chloride (60 mL) purified IBVE (8 mL) and after temp equilibration at −30° C. 1 mL of a 1M soln of deuterated trifluoroacetic acid in methylene chloride was added. The mixture was stirred at −20° C. for 2 h. A 20 mL sample was taken and 5 mL Et$_3$N/MeOH (1/2 vol/vol) was added to this sample. The polymer was obtained by evaporating the solvent using a rotary evaporator. Additional IBVE (8 mL) was added to the polymerization reaction flask. After 3 hours at −10° C., the reaction was quenched by addition of 5 mL Et$_3$N/MeOH (1/2 vol/vol) followed by solvent evaporation. The polymers were dissolved in dichloromethane, washed with water, dried with sodium sulfate, evaporated and dried in a vacuum oven at about 40° C. for at least one day. The first sample weighed 1.43 g (80.3% of theory) and the molecular weight by GPC analysis was $M_n = 8440, D = 1.53$, and the second sample weighed 10.38 g (957% of theory) and $M_n = 14900, D = 1.31$.

EXAMPLE 12

Preparation of Zinc Trifluoroacetate

A solution of diethyl zinc (27.5 mL, 1.1M in toluene) was slowly added to a solution of trifluoroacetic acid (2.77 mL) in dry toluene at −40° C. The reaction temp and the extent of ethane evolution was monitored. After stirring at −40° C. for 30 min, the solution was warmed to room temperature and trifluoroacetic acid (2.77 mL) was slowly added. The mixture was stirred overnight at room temperature, followed by refluxing for 2 h. A foaming suspension with a slight violet tint was formed. All volatiles were evaporated and the solid was dried at 80° C. under high vacuum. Yield: 7.65 g; $^{13}$C-NMR (75

MHz, Methanol-d4): 117.93 ppm (q, I=290.3 Hz, CF$_3$), 163.7 ppm (q, I=36.6 Hz, CO).

Zinc salts of trichloroacetic acid, dichloroacetic acid and acetic acid were prepared similarly and identified accordingly.

Comparative Experiments

EXAMPLE A

Reaction of IBVE with 1-acetoxy-1-isobutyloxy ethane/zinc acetate

In a dry box an oven-dried round bottom flask equipped with a magnetic stirring bar was loaded with zinc acetate (36.7 mg). After attaching a septum adapter bearing a Teflon ® stopcock, the flask was removed from the dry box and charged with dry methylene chloride (60 ml) and purified IBVE (8 ml). After temperature equilibration at −30° C., 1-acetoxy-1-isobutyloxy ethane (0.177 ml) was added to the flask. The mixture was stirred at −30° C. for 2 h, at −10° C. for 2 h and at room temperature for 2.5 h. At this time, 5 ml Et$_3$N/MeOH (1/2, vol/vol) were added. The solvent was evaporated. The residue was redissolved in dichloromethane, washed with water, and the solvent again evaporated. The obtained residue weighed 0.02 g (0.3% of theory).

EXAMPLE B

Reaction of IBVE with zinc acetate

In a dry box an oven-dried round bottom flask equipped with a magnetic stirring bar was loaded with zinc acetate (73.4 mg). After attaching a septum adapter bearing a Teflon ® stopcock, the flask was removed from the dry box and charged with dry methylene chloride (60 ml) and purified IBVE (8 ml). The mixture was stirred at −30° C. for 0.5 h, brought to room temperature within 2 h and stirred at room temperature for 20 h. At this time, 5 ml Et$_3$N/MeOH (1/2, vol/vol) were added. The solvent was evaporated. The polymer was redissolved in dichloromethane, washed with water, and the solvent again evaporated. The obtained polymer weighed 0.73 g (11.9% of theory) and the molecular weight by GPC analysis was M$_n$=10700, D=2.13.

EXAMPLE C

Reaction of IBVE with 1-acetoxy-1-isobutyloxy ethane and zinc trifluoroacetate

In a dry box an oven-dried round bottom flask equipped with a magnetic stirring bar was loaded with zinc trifluoroacetate (58.2 mg). After attaching a septum adapter bearing a Teflon ® stopcock, the flask was removed from the dry box and charged with dry methylene chloride (60 ml) and purified IBVE (8 ml). After temperature equilibration at −30° C., 1-acetoxy-1-isobutyloxy ethane (0.177 ml) was added to the flask. The mixture was stirred at −30° C. for 2 h, at −10° C. for 2 h and at room temperature for 2.5 h. At this time 5 ml Et$_3$N/MeOH (1/2, vol/vol) were added. The solvent was evaporated. The polymer was redissolved in dichloromethane, washed with water, and the solvent again evaporated. The obtained polymer weighed 5.25 g (85.5% of theory) and the molecular weight by GPC analysis was M$_n$=3370, D=2.25.

EXAMPLE D

Reaction of IBVE with 1-acetoxy-1-isobutyloxy ethane and zinc iodide

In a dry box an oven-dried round bottom flask equipped with a magnetic stirring bar was loaded with zinc iodide (63.8 mg). After attaching a septum adapter bearing a Teflon ® stopcock, the flask was removed from the dry box and charged with dry methylene chloride (60 ml) and purified IBVE (8 ml). After temperature equilibration at −30° C., 1-acetoxy-1-isobutyloxy ethane (0.177 ml) was added to the flask. The mixture was stirred at −30° C. for 2 h, at −10° C. for 2 h and at room temperature for 2.5 h. At this time, 5 ml Et$_3$N/MeOH (1/2, vol/vol) were added. The solvent was evaporated. The polymer was redissolved in dichloromethane, washed with water, and the solvent again evaporated. The obtained polymer weighed 2.55 g (41.5% of theory) and the molecular weight by GPC analysis was M$_n$=4180, D=2.2.

EXAMPLE E

Successive Monomer Addition Experiment

In a dry box two oven-dried round bottom flasks equipped with magnetic stirring bars were loaded with zinc trifluoroacetate (#1 - 58.2 mg) and zinc iodide (#3 - 63.8), respectively. After attaching a septum adapter bearing a Teflon ® stopcock, the flasks were removed from the dry box and each charged with dry methylene chloride (60 ml) and purified IBVE (8 ml). After temperature equilibration at −30° C., 1-acetoxy-1-isobutyloxy ethane (0.177 ml) was added to each flask. The mixture was stirred at −20° C. for 2 h. A 20 ml sample was taken from each flask to which 5 ml Et$_3$N/MeOH (1/2, vol/vol) was added. The polymer was obtained by evaporating the solvent using a rotary evaporator. An addition amount of 8 ml IBVE was added to each of the reaction flasks. After 3 h at −10° C., the reactions were quenched by addition of 5 ml Et$_3$N/MeOH (1/2, vol/vol) to each flask and the volatile material evaporated. The solutions of the resulting polymers in dichloromethane were washed with water, the solvent evaporated, and the polymers dried in a vacuum oven at 40° C. for at least one day. The first sample of #1 weighed 0.45 g (25% of theory) and the molecular weight by GPC analysis was M$_n$=5630, D=2.22, and the second sample of #1 weighed 4.78 g (38.9% of theory() and M$_n$=6250, D=1.87. The first sample of #3 weighed 0.2 g (11.1% of theory) and the molecular weight by GPC analysis was M$_n$=11400, D=3.47, and the second sample of #3 weighed 1.02 g (8.3% of theory) and M$_n$=12300, D=2.42.

In comparison with Example 11, under the conditions of Comparative Example E, no living polymerizaton occurred as it had in Example 11.

Although preferred embodiments of the invention have been illustrated and described hereinabove, it is to be understood that there is no intent to limit the invention to the precise constructions herein described. Rather it is to be further understood that the right is reserved to all changes and modifications coming within the scope of the invention as defined by the appended claims.

We claim:

1. A process for the living cationic polymerization of electron rich vinyl monomers containing electron donating substituents, comprising contacting said electron rich vinyl monomers under polymerizing conditions, in a substantially anhydrous reaction medium, with an initiator/catalyst combination including one or more saturated halogenated aliphatic acids of the formula $$C_nH_aX_bCX_2CO_2H$$

wherein:
n=0–3,
a=0–7,
b=0–7, and
X is selected from the group consisting of fluorine, chlorine and bromine as the initiator, and the zinc salts of the same or different said saturated halogenated aliphatic acids, as the catalyst.

2. The process of claim 1 wherein the pKa of the saturated halogenated aliphatic acid is less than 2.5.

3. The process of claim 1 conducted in a solvent.

4. The process of claim 3 wherein the solvent is selected from $C_5=C_{14}$ alkanes, cycloalkanes or mixtures thereof; benzene, toluene, xylene, methylene chloride, chloroform and carbon tetrachloride.

5. The process of claim 3 wherein the solvent is selected from $C_5-C_{14}$ alkanes, cycloalkanes or mixtures thereof; benzene, toluene, xylene, methylene chloride, chloroform and carbon tetrachloride.

6. The process of claim 1 conducted within a temperature range of about −80° C. to about room temperature.

7. The process of claim 6 conducted within a temperature range of about −30° C. to about room temperature.

8. The process of claim 3 conducted within a temperature range of about −80° C. to the refluxing solvent temperature.

9. The process of claim 8 wherein the solvent is selected from $CH_2Cl_2$, $CCl_4$ toluene and benzene.

10. The process of claim 9 wherein the solvent is selected from $CH_2Cl_2$ and $CCl_4$ and the process temperature is about −30° C. to about −10° C.

11. The process of claim 1 carried out in an inert atmosphere.

12. The process of claim 3 carried out in an inert atmosphere.

13. The process of claim 11 wherein the inert atmosphere is selected from nitrogen, argon, helium and a mixture thereof.

14. The process of claim 12 wherein the inert atmosphere is selected from nitrogen, argon, helium and a mixture thereof.

15. The process of claim 1 wherein the contacting of the unsaturated monomers with the initiator/catalyst combination is done by adding the monomers to a mixture of initiator and catalyst.

16. The process of claim 3 wherein the contacting of the unsaturated monomers with the initiator/catalyst combination is done by adding the monomers to a mixture of initiator and catalyst.

17. The process of claim 1 wherein the contacting of the unsaturated monomers with the initiator/catalyst combination is done by adding catalyst to a mixture of initiator and monomer.

18. The process of claim 3 wherein the contacting of the unsaturated monomers with the initiator/catalyst combination is done by adding catalyst to a mixture of initiator and monomer.

19. The process of claim 1 wherein the initiator/catalyst combination is trichloroacetic acid and zinc trifluoroacetate.

20. The process of claim 3 wherein the initiator/catalyst combination is trichloroacetic acid and zinc trifluoroacetate.

21. The process of claim 1 wherein the contacting of the unsaturated monomers with the initiator/catalyst combination is done by adding initiator to a mixture of monomer and catalyst.

22. The process of claim 21 conducted within a temperature range of about −20° C. to about −30° C.

23. The process of claim 3 wherein the contacting of the unsaturated monomers with the initiator/catalyst combination is done by adding initiator to a mixture of monomer and catalyst.

24. The process of claim 23 conducted within a temperature range of about −20° C. to about −30° C.

25. The process of claim 3 conducted in hexane at room temperature.

* * * * *